United States Patent [19]

Kawanishi et al.

[11] Patent Number: 5,629,941
[45] Date of Patent: May 13, 1997

[54] MULTIPLEX TRANSMISSION SYSTEM

[75] Inventors: Toshiaki Kawanishi, Akishima; Koji Terayama, Hiroshima, both of Japan

[73] Assignee: Mazda Motor Corporation, Hiroshima, Japan

[21] Appl. No.: 390,225

[22] Filed: Feb. 16, 1995

[30] Foreign Application Priority Data

Feb. 16, 1994 [JP] Japan .................................. 6-019112

[51] Int. Cl.$^6$ ............................................. H04L 12/40
[52] U.S. Cl. ................ 370/236; 370/457; 340/825.5
[58] Field of Search ..................... 370/13, 14, 16, 370/16.1, 85.1, 85.2, 85.3, 85.6, 85.7, 85.8, 85.15; 307/10.1; 340/825.05, 825.06, 825.08, 825.16, 825.5, 825.51; 371/32.33

[56] References Cited

U.S. PATENT DOCUMENTS

| | | | |
|---|---|---|---|
| 4,747,097 | 5/1988 | Ohya et al. | 370/16 |
| 4,780,620 | 10/1988 | Hogberg et al. | 307/10.1 |
| 5,263,022 | 11/1993 | Nobutoki et al. | 370/85.8 |
| 5,272,699 | 12/1993 | Nobutoki et al. | 370/85.1 |
| 5,289,466 | 2/1994 | Nobutoki et al. | 370/85.2 |

FOREIGN PATENT DOCUMENTS

1-143533 of 1989 Japan .
2-16845 of 1990 Japan .

*Primary Examiner*—Alpus H. Hsu

[57] ABSTRACT

The object of this invention is to provide a multiplex transmission system which can effectively reduce the traffic amount associated with digital information on a communication line and can improve the efficiency of digital information transmission during a period after the beginning of activation of each of a plurality of communication nodes connected to the communication line until the communication nodes are set in a normal operation state. The multiplex transmission system includes a communication line (11) for transmitting multiplexed digital information, and a plurality of communication nodes (12A, 12B, 12C) each of which incorporates an arithmetic processing unit, and performs an information output operation for outputting digital information onto the communication line (11), and an information fetching operation for selectively fetching digital information from the communication line (11). Upon activation of the plurality of communication nodes (12A, 12B, 12C), a communication node, which is set in a normal operation state earliest, of the plurality of communication nodes (12A, 12B, 12C) outputs digital activation information, and the remaining nodes are shifted to the normal operation state in accordance with the digital activation information.

25 Claims, 7 Drawing Sheets

FIG. 7

MULTIPLEX TRANSMISSION SYSTEM

BACKGROUND OF THE INVENTION

1. Field of the Invention

The present invention relates to a multiplex transmission system in which a plurality of communication nodes are connected to a communication line for multiplex-transmitting a plurality of kinds of digital information to send the digital information onto the communication line and to receive the digital information from the communication line.

2. Description of the Related Art

In recent vehicles, along with the increase in the number of electrical equipments or control systems to be equipped, and the advance of electronic components in various electrical equipments or control systems, the numbers of wiring lines, connectors, and electronic controllers considerably have increased, and as a result, problems of an increase in scale of wire harnesses and an increase in vehicle weight have arisen. The increase in scale of wire harnesses limits their mounting space onto a vehicle body, and decreases their flexibility since a bundle of a plurality of wire harnesses must be formed, resulting in assembling operations with low efficiency. The increase in weight of wire harnesses directly leads to an increase in weight of a vehicle.

Recently, in order to solve the above-mentioned problems, a multiplex transmission system which can reduce the numbers of wiring lines, connectors, and electronic controllers in a vehicle has been developed. As disclosed in, e.g., Japanese Patent Laid-Open No. 2-16845, this system comprises a common communication line for multiplex-transmitting a plurality of kinds of digital information for controlling the operations of various electrical equipments, control systems, and the like equipped in a vehicle, and a plurality of communication nodes which are connected to the communication line, and output or fetch digital information onto or from the communication line, and the electrical equipments, control systems, and the like equipped in the vehicle are appropriately connected to the plurality of communication nodes so as to constitute a multiplex communication network in a passenger room.

In such a multiplex communication system, the communication line for transmitting multiplexed digital information is formed by a signal transmission path formed by wire harnesses arranged in a vehicle body, signal generation circuits such as various sensors, switches, and the like, and driving circuits for lamps, actuators, motors, and the like arranged at predetermined positions in the vehicle are connected in units of groups to the plurality of communication nodes connected to the communication line. Each communication node to which a signal generation circuit or driving circuit is connected comprises, e.g., a communication circuit connected to the communication line, an input/output processing circuit connected to the signal generation circuit or the driving circuit, and an arithmetic processing unit which is arranged between these circuits and comprises a microcomputer. The arithmetic processing circuit generates digital information for controlling the operations of motors or the like on the basis of a signal input from the signal generation circuit via the input/output processing circuit. The communication circuit outputs the digital information generated by the input/output processing circuit and the arithmetic unit onto the communication line, and fetches selected operation control digital information the communication line. The arithmetic processing unit and the input/output processing circuit generate an operation control signal on the basis of the digital information fetched via the communication circuit, and outputs the operation control signal to the connected driving circuit, thus controlling the operation of the driving circuit. Each digital information multiplex-transmitted via the communication line is expressed by a pulse-code modulation (PCM) signal, and has a format of a non-return-to-zero (NRZ) modulated carrier signal obtained by NRZ modulation.

As described above, in the multiplex communication system which is constituted by connecting the plurality of communication nodes for outputting or fetching digital information onto or from the communication line, or outputting or fetching digital information in the vehicle, for example, a predetermined data frame is formed, so that digital information output from each communication node onto the communication line can be easily fetched by a predetermined designated communication node. This data frame is a group of code data complying with a predetermined data format whose total bit length is set in advance by a predetermined number of bits.

As described in, e.g., Japanese Patent Laid-Open No. 1-143533, after activation is started by switching a power supply unit for supplying electric power to the communication nodes from an inoperative state (OFF state) to an operative state (ON state), each of the plurality of communication nodes connected to the communication line is set in a transmission/reception enable state in which the node can output or fetch digital information onto or from the communication line, after an elapse of a predetermined rise time. Each communication node set in the transmission/reception enable state outputs a transmission request data frame which describes contents for requesting another communication node to output designated digital information. The other communication node which fetches the transmission request data frame reads the designated digital information to be output in response to the contents of the transmission request data frame, sets its own initial operation state based on the data frame, and thereafter, is set in a normal operation state.

However, in the conventional multiplex transmission system, the rise times of the communication nodes after activation is started by switching the power supply unit of the plurality of communication nodes from an OFF state to an ON state are slightly different from each other due to different circuit arrangements of the communication nodes, variations of the characteristics of circuit elements, and the like although they are designed to be constant. Therefore, the times required for the plurality of communication nodes to attain the transmission/reception enable state after the beginning of activation are different from each other depending on their rise times, and the different rise times adversely influence the setting operations of the initial operation states of the communication nodes.

More specifically, when a communication node, which has a relatively short rise time, and requires a relatively short period of time until it is set in a transmission/reception enable state after the beginning of activation, outputs a transmission request data frame for executing the setting operation of the initial operation state, another communication node, which has a relatively long rise time, and requires a relatively long period of time until it is set in a transmission/reception enable state after the beginning of activation, is not set in the transmission/reception enable state yet, and such a communication node cannot receive the transmission request data frame. Furthermore, when the transmission request data frame output from a communication node with a relatively short rise time describes contents for requesting a communication node with a relatively long rise time to output designated digital information, the communication node with a relatively long rise time is not set in the transmission/reception enable state at the time of output of the first transmission request data frame from the communication node with a relatively short rise time, and does not output designated digital information. Therefore, the communication node with a relatively short rise time cannot set its initial operation state when it outputs the first transmission request data frame, and must repetitively output the transmission request data frame. Only after the communication node with a relatively long rise time is set in the transmission/reception enable state, and outputs designated digital information in accordance with the contents of the transmission request data frame output from the communication node with a relatively short rise time, the communication node with a relatively short rise time can set its initial operation state.

As described above, when a transmission request data frame output from a communication node with a relatively short rise time describes contents for requesting a communication node with a relatively long rise time to output designated digital information, the communication node with a relatively short rise time cannot execute the setting operation of its initial operation state until the communication node with a relatively long rise time is set in the transmission/reception enable state, and must repetitively output the transmission data frame during this interval. Therefore, the traffic amount associated with digital information on the communication line, to which the communication nodes are connected, increases, and may disturb efficient transmission of digital information via the communication line and realization of quick transmission/reception at the respective communication nodes.

SUMMARY OF THE INVENTION

The present invention has been made in consideration of the above situation, and has as its object to provide a multiplex transmission system which can efficiently reduce the traffic amount associated with digital information on a communication line and can realize efficient transmission of digital information via the communication line and quick transmission/reception at respective communication nodes even in a system which is constituted by a plurality of communication nodes connected to a communication line for multiplex-transmitting a plurality of kinds of digital information, and in which the rise times of the communication nodes are different from each other.

In order to solve the above-mentioned problems and to achieve the above-mentioned object, a multiplex transmission system according to the first invention of the present invention is characterized by comprising the following arrangement.

More specifically, there is provided a multiplex transmission system to which a plurality of communication nodes are connected via a multiplex transmission path, and in which each of the plurality of communication nodes comprises a control unit for, when a communication state is normal, controlling to transmit a communication frame having its own predetermined data via the multiplex transmission path and to selectively receive a communication frame transmitted from another communication node, each of the plurality of communication nodes comprising:

detection means for detecting if the communication state of its own communication node is normal;

means for, when the communication state of the communication node is not normal, measuring a predetermined first period after detection of the communication state, and inhibiting transmission and reception of the communication frame during the first period;

means for measuring a predetermined second period after the end of measurement of the first period, and inhibiting transmission of the communication frame but permitting reception of the communication frame during the second period; and means for, when a predetermined communication frame transmitted from another communication node is received during the second period, permitting transmission of the communication frame of its own node before the end of the measurement of the second period.

As described above, according to the first invention, the first and second periods are measured, transmission of a communication frame is inhibited during the second period, and reception of a communication frame is permitted during the second period. In addition, when a predetermined communication frame transmitted from another communication node is received during the second period, transmission of a communication frame of its own node is permitted before an elapse of the second period. When the second period has elapsed without receiving a predetermined communication frame from another communication node, transmission of a communication frame of its own node is permitted. For this reason, even when the plurality of communication nodes have different rise times upon their activation or reset, the traffic amount associated with digital data on the multiplex transmission path during a period required until the communication nodes are respectively set in a normal operation state after the beginning of activation can be efficiently reduced, and efficient transmission of digital data via the multiplex transmission path and quick transmission/reception at the respective communication nodes can be realized.

A multiplex transmission system according to the second invention of the present invention is characterized by comprising the following arrangement.

More specifically, there is provided a multiplex transmission system to which a plurality of communication nodes are connected via a multiplex transmission path, and in which each of the plurality of communication nodes comprises a control unit for, when a communication state is normal, controlling to transmit a communication frame having its own predetermined data via the multiplex transmission path and to selectively receive a communication frame transmitted from another communication node, each of the plurality of communication nodes comprising:

detection means for detecting if the communication state of its own communication node is normal;

means for, when the communication state of the communication node is not normal, measuring a predetermined first period after detection of the communication state, and inhibiting transmission and reception of the communication frame during the first period; and means for measuring a predetermined second period after the end of measurement of the first period, and inhibiting transmission of the communication frame but permitting reception of the communication frame during the second period, wherein the communication node, in which the second period ends earliest and transmission of the communication frame is permitted, of the plurality of communication nodes transmits a predetermined communication frame from its own node via the multiplex transmission path.

As described above, according to the second invention, the first and second periods are measured, transmission of a communication frame is inhibited during the second period, and reception of a communication frame is permitted during the second period. In addition, the plurality of communication nodes, except for a communication node in which the second period ends earliest, and transmission of a communication frame is permitted, do not transmit their predetermined communication frames via the multiplex transmission path. For this reason, even when the plurality of communication nodes have different rise times upon their activation or reset, the traffic amount associated with digital data on the multiplex transmission path during a period required until the communication nodes are respectively set in a normal operation state after the beginning of activation can be efficiently reduced, and the communication nodes can be quickly set in the normal operation state.

A multiplex transmission system according to the third invention of the present invention is characterized by comprising the following arrangement.

More specifically, there is provided a multiplex transmission apparatus which transmits a communication frame having its own predetermined data via a multiplex transmission path, and selectively receives a communication frame transmitted from a transmitting side, comprising:

detection means for detecting a predetermined condition;

means for, when the predetermined condition is detected, measuring a predetermined first period, and inhibiting transmission and reception of the communication frame during the first period;

means for measuring a predetermined second period after the end of measurement of the first period, and inhibiting transmission of the communication frame but permitting reception of the communication frame during the second period;

means for, when a predetermined communication frame is received during the second period, permitting transmission of the communication frame before an elapse of the second period, and for, when the second period has elapsed without receiving the predetermined communication frame, permitting transmission of its own communication frame; and means for, when the second period has elapsed, transmitting the predetermined communication frame.

As described above, according to the third invention, the first and second periods are measured, transmission of a communication frame is inhibited during the second period, and reception of a communication frame is permitted during the second period. In addition, when a predetermined communication frame transmitted from another communication node is received during the second period, transmission of a communication frame of its own node is permitted before an elapse of the second period. When the second period has elapsed without receiving a predetermined communication frame from another communication node, transmission of a communication frame of its own node is permitted. For this reason, even when the communication nodes have different rise times upon their activation or reset, the traffic amount associated with digital data on the multiplex transmission path can be efficiently reduced, and the communication nodes can be quickly returned to the normal state.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will be described in detail below with reference to the accompanying drawings.

Figure 1:
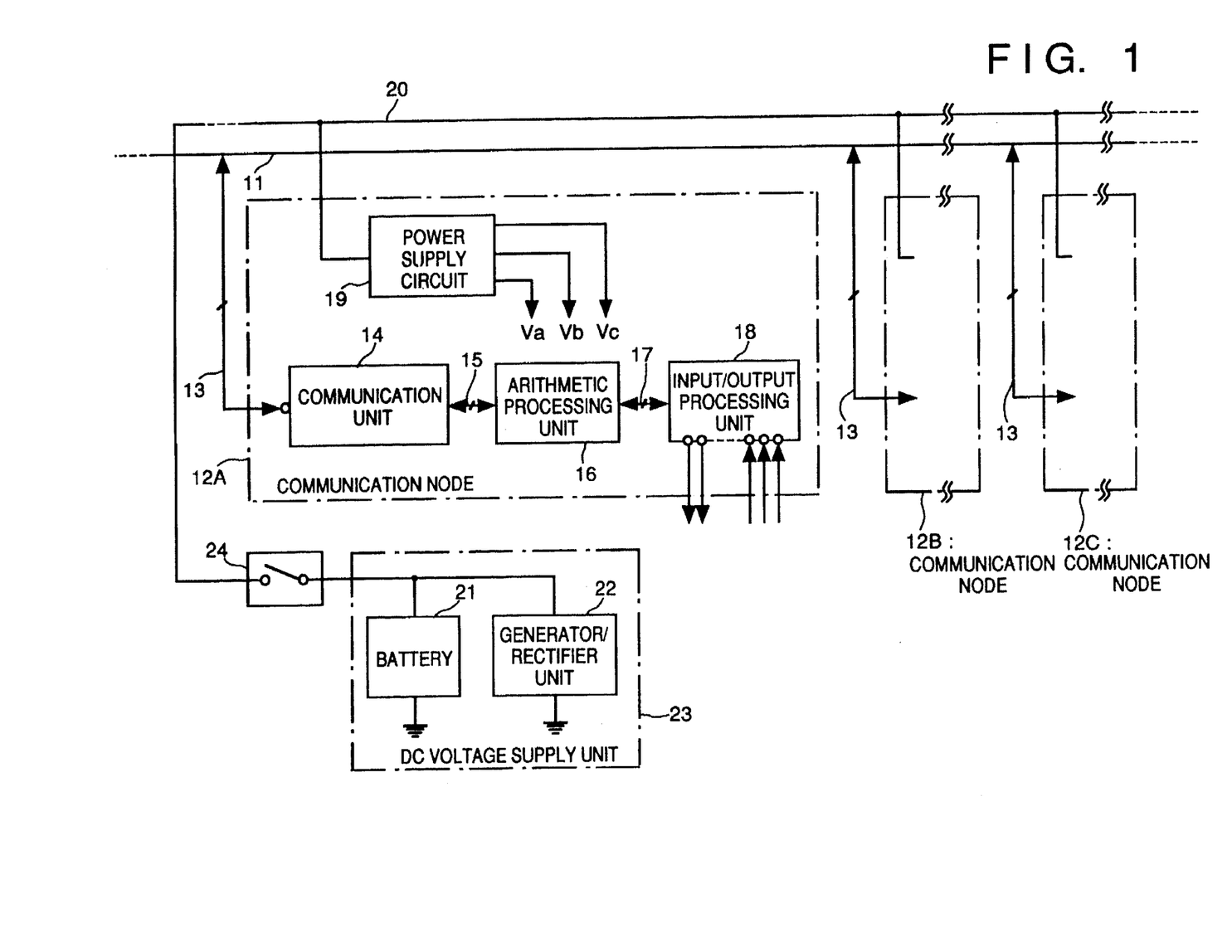
FIG. 1 is a block diagram showing an example of a multiplex transmission system according to the present invention.

FIG. 1 shows an example of a multiplex transmission system according to the present invention, and in this example, the present invention is applied to a vehicle.

In the embodiment shown in FIG. 1, a plurality of communication nodes 12A, 12B, and 12C are connected to a communication line 11 which is arranged in a vehicle body and multiplex-transmits a plurality of kinds of digital information. The communication node 12A incorporates a communication unit 14 which has a communication input/output terminal connected to the communication line 11 via a bidirectional service line 13, an arithmetic processing unit 16 connected to the communication unit 14 via a data bus 15, an input/output processing unit 18 connected to the arithmetic processing unit 16 via a data bus 17, and a power supply circuit 19 connected to a power supply line 20. Although not shown, operation-controlled units in a vehicle such as a lamp driving unit, and like are connected to the input/output terminal of the input/output processing unit 18, and signal generators such as a switch for operating retractable head lamps, a sensor used for detecting the operation state of an air-conditioning apparatus, and the like are connected to the input/output terminal.

The power supply line 20 is connected, via a power switch 24, to a DC power supply unit 23 which comprises a battery 21 equipped in the vehicle, and a generator/rectifier unit 22 including an AC generator driven by the engine of the vehicle, and a rectifier for rectifying an output generated by the AC generator to obtain a DC voltage. When the power switch 24 is turned on, the power supply line 20 receives a DC voltage from the DC voltage supply unit 23 via the power switch 24. The power supply line 20 including the DC voltage supply unit 23 and the power switch 24 serves as a common power supply unit for supplying electric power to the communication nodes 12A, 12B, and 12C.

The power supply circuit 19 connected to the power supply line 20 transforms a DC voltage obtained from the DC voltage supply unit 23 via the power supply line 20 into a predetermined voltage value for each communication node. For example, the power supply voltage in the communication node 12A is set to be three different voltages Va, Vb, and Vc in correspondence with the operation voltage values of the circuits, and these voltages are properly supplied to the communication unit 14, the arithmetic processing unit 16, the input/output processing unit 18, and other circuit portions in the communication node 12A.

Although not shown, each of the communication nodes 12B and 12C incorporates a communication unit which has a communication input/output terminal connected to the communication line 11 via the bidirectional service line 13, an arithmetic processing unit connected to the communication unit via a data bus, an input/output processing unit connected to the arithmetic processing unit via a data bus, and a power supply circuit connected to the power supply line 20, as in the communication node 12A. The input/output processing unit is connected to operation-controlled units or signal generators arranged at the respective portions in the vehicle. The power supply circuit transforms a DC voltage obtained from the DC voltage supply unit 23 via the power supply line 20 into predetermined power supply voltages in each communication node, and appropriately supplies these voltages to the communication unit, the arithmetic processing unit, the input/output processing unit, and other circuit portions in each of the communication nodes 12B and 12C.

In the above-mentioned multiplex transmission system, when the power switch 24 inserted in the power supply line 20 is switched from an OFF state to an ON state, and a DC voltage from the DC voltage supply unit 23 is obtained via the power supply line 20, i.e., the power supply unit is turned from an OFF state to an ON state, the DC voltage from the DC voltage supply unit 23 is supplied to the power supply circuit 19 of the communication node 12A via the power supply line 20, and the entire communication node is activated. In the communication node 12A, when the activation of the arithmetic processing unit 16 and the input/output processing unit 18 are completed and these units are set in a normal operation state, operation control of the communication unit 14 is executed. More specifically, digital information based on an output signal from a signal generator connected to the input/output processing unit 18 is input from the input/output processing unit 18 to the arithmetic processing unit 16 via the data bus 17, and communication digital information generated by the arithmetic processing unit 16 based on the input digital information is supplied from the arithmetic processing unit 16 to the communication unit 14 via the data bus 15. The communication digital information is then output from the communication unit 14 onto the communication line 11 via the bidirectional service line 13. Communication digital information transmitted from the communication line 11 via the bidirectional service line 13 is selectively fetched via the communication unit 14, and is input to the arithmetic processing unit 16 via the data bus 15. Digital information based on the communication digital information fetched from the communication line is input from the arithmetic processing unit 16 to the input/output processing unit 18 via the data bus 17, and a control signal corresponding to the input digital information is output from the input/output processing unit 18 to the operation-controlled units connected to the input/output processing unit 18. Also, the input/output processing unit performs a selective information fetching operation from the operation-controlled units.

On the other hand, when the power switch 24 inserted in the power supply line 20 is switched from an OFF state to an ON state, and the power supply unit is turned from an OFF state to an ON state, the power supply circuit of each of the communication nodes 12B and 12C begins to receive the DC voltage from the DC voltage supply unit 23 via the power supply line 20, and the entire communication node is activated. In each of the communication nodes 12B and 12C, since the arithmetic processing unit and the input/output processing unit perform operation control of the communication unit, when each node is activated and is set in a normal operation state, the information output operation and the information fetching operation are selectively performed in the same manner as in the communication node 12A.

Figure 2:
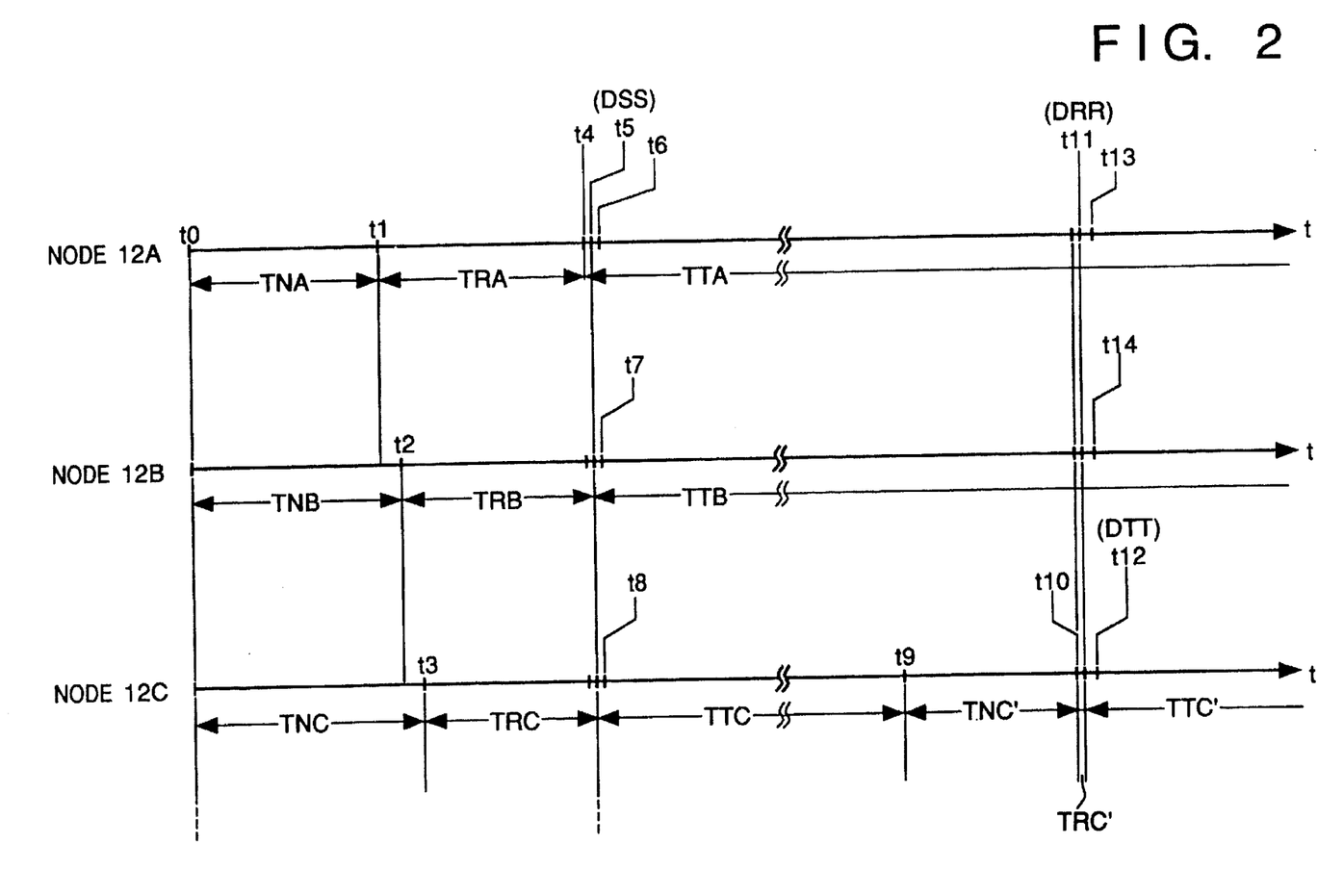
FIG. 2 is a timing chart for explaining the operation timings of the multiplex transmission system according to the present invention.

In this manner, in the example of the multiplex transmission system of the present invention, which is constituted by connecting the plurality of communication nodes 12A, 12B, and 12C to the communication line 11, when the power switch 24 inserted in the power supply line 20 is switched from an OFF state to an ON state, and the plurality of communication nodes 12A, 12B, and 12C are activated, and during a predetermined period after the activation, each of the plurality of communication nodes 12A, 12B, and 12C performs an operation to be described below with reference to FIG. 2.

FIG. 2 is a timing chart for explaining the operation timings of the multiplex transmission system according to the present invention.

Referring to FIG. 2, when the power switch 24 inserted in the power supply line 20 is switched from an OFF state to an ON state, the DC voltage obtained form the DC voltage supply unit 23 via the power supply line 20 is supplied to the communication nodes 12A, 12B, and 12C, and activation of these communication nodes 12A, 12B, and 12C is started. In the communication node 12A which begins to be activated, the arithmetic processing unit 16 inhibits both the information output operation and the information fetching operation performed via the communication unit 14 during a predetermined period TNA from an activation start timing t0 to a later timing t1. Therefore, the communication node 12A performs neither the output operation of digital information onto the communication line 11 nor the fetching operation of digital information from the communication line 11 via the bidirectional service line 13 during the period TNA. The period TNA is set to be longer than the rise time of the communication node 12A.

Similarly, in the communication node 12B which begins to be activated, the arithmetic processing unit inhibits both the information output operation and the information fetching operation performed via the communication unit during a predetermined period TNB from the activation start timing t0 to a later timing t2. Therefore, the communication node 12B performs neither the output operation of digital information onto the communication line 11 nor the fetching operation of digital information from the communication line 11 via the bidirectional service line 13 during the period TNB. The period TNB is set to be longer than the rise time of the communication node 12B.

Also, in the communication node 12C which begins to be activated, the arithmetic processing unit inhibits both the information output operation and the information fetching operation performed via the communication unit during a predetermined period TNC from the activation start timing t0 to a later timing t3. Therefore, the communication node 12C performs neither the output operation of digital information onto the communication line 11 nor the fetching operation of digital information from the communication line 11 via the bidirectional service line 13 during the period TNC. The period TNC is set to be longer than the rise time of the communication node 12C.

These periods TNA, TNB, and TNC are different from each other in practice upon individual measurements in the communication nodes 12A, 12B and 12C although they are set to be equal to each other in circuit design. For example, in correspondence with the characteristics of the communication nodes 12A, 12B, and 12C, the period TNA is shorter than the period TNB, and the period TNB is shorter than the period TNC, as shown in FIG. 2.

In the communication node 12A, when the timing t1 has reached and the period TNA has elapsed, the arithmetic processing unit 16 permits the information fetching operation performed via the communication unit 14 and inhibits the information output operation performed via the communication unit 14 during a period TRA following the period TNA, as shown in FIG. 2. Therefore, during the period TRA, the communication node 12A performs the fetching operation of digital information from the communication line 11 via the bidirectional service line 13, but does not perform the output operation of digital information onto the communication line 11 via the bidirectional service line 13.

Similarly, in the communication node 12B, when the timing t2 has reached and the period TNB has elapsed, the arithmetic processing unit permits the information fetching operation performed via the communication unit and inhibits the information output operation performed via the communication unit during a period TRB following the period TNB, as shown in FIG. 2. Therefore, during the period TRB, the communication 12B performs the fetching operation of digital information from the communication line 11 via the bidirectional service line 13, but does not perform the output operation of digital information onto the communication line 11 via the bidirectional service line 13.

Also, in the communication node 12C, when the timing t3 has reached and the period TNC has elapsed, the arithmetic processing unit permits the information fetching operation performed via the communication unit and inhibits the information output operation performed via the communication unit during a period TRC following the period TNC, as shown in FIG. 2. Therefore, during the period TRC, the communication node 12C performs the fetching operation of digital information from the communication line 11 via the bidirectional service line 13, but does not perform the output operation of digital information onto the communication line 11 via the bidirectional service line 13.

These periods TRA, TRB, TRC are also set to be equal to each other in design, but are independently measured in the communication nodes 12A, 12B, and 12C. As a result, in practice, in the communication node 12A, the period TRA starting from the timing t1 terminates at a timing t4. However, at the timing t4 at which the period TRA has elapsed in the communication node 12A, the period TRB in the communication node 12B still continues, and the period TRC in the communication node 12C still continues.

In the communication node 12A, the information fetching operation performed via the communication unit 14 is permitted during the period TRA. However, during the period TRA, no digital activation information DSS (to be described later) arrives via the communication line 11 and the bidirectional service line 13, and no fetching operation of digital activation information is performed. When the timing t4 has reached and the period TRA has elapsed without fetching the digital activation information DSS, the arithmetic processing unit 16 permits the information output operation performed via the communication unit 14 in addition to the information fetching operation performed via the communication unit 14 during a period TTA after the timing t4, as shown in FIG. 2. Therefore, during the period TTA after the timing t4, the communication node 12A is set in a normal operation state in which the information fetching operation and the information output operation are selectively performed, and selectively performs the fetching operation of digital information from the communication line 11 via the bidirectional service line 13, and the output operation of digital information onto the communication line 11 via the bidirectional service line 13.

In the communication node 12A in the normal operation state, the arithmetic processing unit 16 outputs digital activation information DSS indicating the end of activation as communication digital information to the communication unit 14 via the data bus 15 at a timing t5 immediately after the timing t4, as shown in FIG. 2, and the digital activation information DSS is output from the communication unit 14 onto the communication line 11 via the bidirectional service line 13. In this case, the digital activation information DSS is one of some pieces of digital control information generated by the arithmetic processing unit 16, and forms a data frame as in other kinds of digital control information. The digital activation information DSS is converted into the format of, e.g., an NRZ (non-return-to-zero) modulation carrier signal in the communication unit 14. In this manner, the communication node 12A outputs the digital activation information DSS in the format of the NRZ modulation carrier signal onto the communication line 11 via the bidirectional service line 13 at the timing t5.

Figure 3:
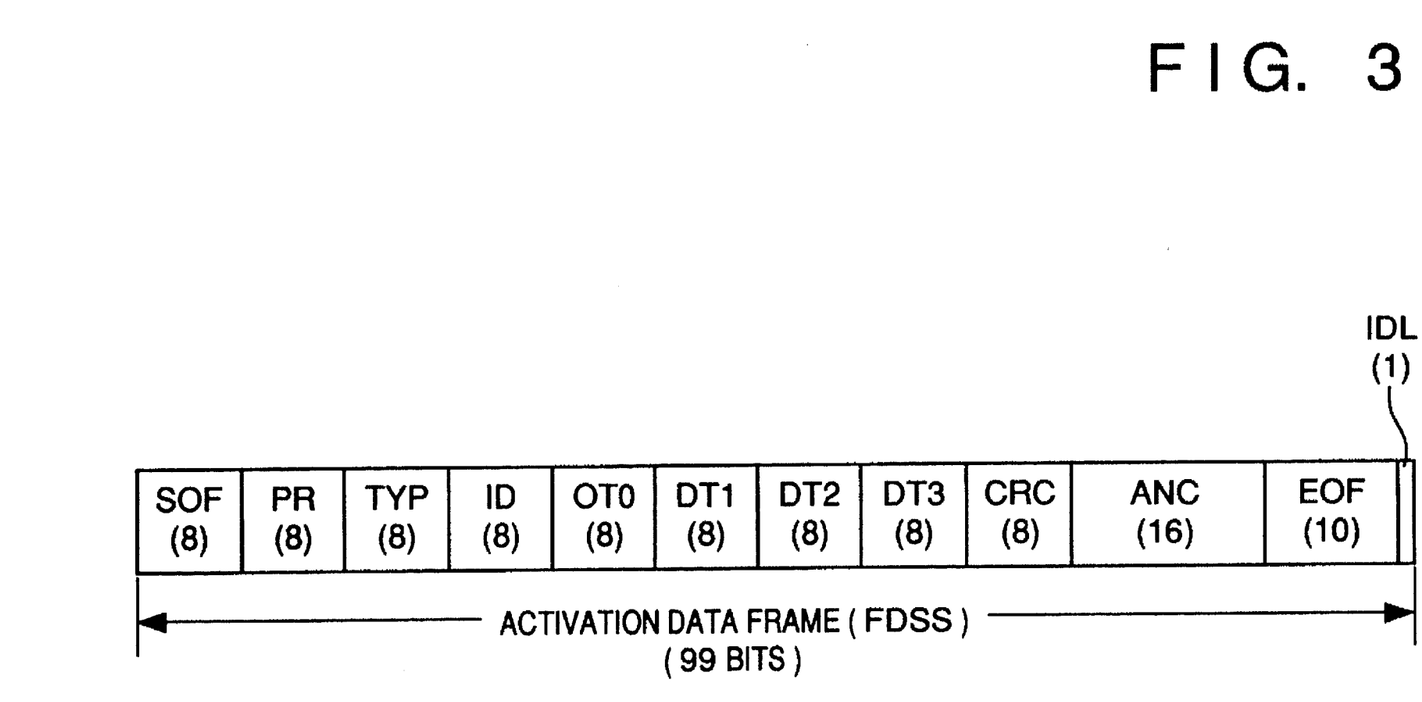
FIG. 3 is a schematic view for explaining the data format of a data frame of digital control information processed in the multiplex transmission system according to the present invention.

An activation data frame FDSS as a data frame formed by the digital activation information DSS is a group of code data, which has a predetermined data length (e.g., 99 bits), as shown in FIG. 3. In the data format of this frame, an 8-bit frame start marker SOF, 8-bit data PR associated with the priority order, 8-bit data TYP indicating the type of data frame, 8-bit information identification data ID indicating the type of digital information to be transmitted, 8-bit data DT0, DT1, DT2, and DT3 indicating digital information to be transmitted, 8-bit error correction data CRC, 16-bit information reception acknowledge data ANC, a 10-bit frame end marker EOF, and a 1-bit idling marker IDL sequentially appear. In the activation data frame FDSS with the above format, the information identification data ID indicates the digital activation information DSS, and the data DT0, DT1, DT2, and DT3 indicate the contents of the digital activation information DSS.

Referring back to FIG. 2, the digital activation information DSS output from the communication node 12A onto the communication line 11 via the bidirectional service line 13 at the timing t5 immediately after the timing t4 is fetched by the communication unit of the communication node 12B, which is still in the period TRB, via the bidirectional service line 13, and is input to the arithmetic processing unit. Also, in the communication node 12C which is still in the period TRC, the digital activation information DSS is fetched from the communication line 11 by the communication unit via the bidirectional service line 13, and is input to the arithmetic processing unit.

In the communication node 12B which fetched the digital activation information DSS from the communication node 12A, the arithmetic processing unit permits the information output operation performed via the communication unit in addition to the information fetching operation performed via the communication unit, in accordance with the fetched digital activation information DSS. Therefore, in the communication node 12B, as shown in FIG. 2, the period TRB starting from the timing t2 ends at the timing t5 before an elapse of a predetermined period of time, and during a period TTB after the timing t5, a normal operation state in which the information fetching operation and the information output operation are selectively performed is set. As a result, the fetching operation of digital information from the communication line 11 via the bidirectional service line 13 and the output operation of digital information onto the communication line 11 via the bidirectional service line 13 are selectively performed.

Similarly, in the communication node 12C which fetched the digital activation information DSS from the communication node 12A, the arithmetic processing unit permits the information output operation performed via the communication unit in addition to the information fetching operation performed via the communication unit, in accordance with the fetched digital activation information DSS. Therefore, in the communication node 12C, as shown in FIG. 2, the period TRC starting from the timing t3 ends at the timing t5 before an elapse of a predetermined period of time, and during a period TTC after the timing t5, a normal operation state in which the information fetching operation and the information output operation are selectively performed is set. As a result, the fetching operation of digital information from the communication line 11 via the bidirectional service line 13 and the output operation of digital information onto the communication line 11 via the bidirectional service line 13 are selectively performed.

In the communication node 12A which was set in the normal operation state after the timing t4, as shown in FIG. 2, the arithmetic processing unit 16 performs an initial information output operation for outputting a group of necessary digital control information onto the communication line 11 via the communication unit 14 and the bidirectional service line 13 at a timing t6 immediately after the timing t5. In this case, each digital control information has the same data frame as the activation data frame FDSS shown in FIG. 3, and is converted into the format of, e.g., an NRZ modulation carrier signal in the communication unit 14. Therefore, at the timing t6, the communication node 12A sequentially outputs a plurality of kinds of digital control information each having the format of the NRZ modulation carrier signal onto the communication line 11 via the bidirectional service line 13.

In this manner, each digital control information output from the communication node 12A onto the communication line 11 via the bidirectional service line 13 at the timing t6 is fetched as needed by each of the communication nodes 12B and 12C via the communication unit under the control of the arithmetic processing unit, and is used in an initial operation state setting operation in each of the communication nodes 12B and 12C. Similarly, digital control information output from the communication node 12B onto the communication line 11 via the bidirectional service line 13 at a timing t7 is fetched as needed by each of the communication nodes 12C and 12A via the communication unit under the control of the arithmetic processing unit, and is used in an initial operation state setting operation in each of the communication nodes 12C and 12A. Also, digital control information output from the communication node 12C onto the communication line 11 via the bidirectional service line 13 at a timing t8 is fetched as needed by each of the communication nodes 12A and 12B via the communication unit under the control of the arithmetic processing unit, and is used in an initial operation state setting operation in each of the communication nodes 12A and 12B.

As described above, in the multiplex transmission system according to the present invention shown in FIG. 1, during a period after the beginning of activation of each of the communication nodes 12A, 12B, and 12C until these nodes are set in a normal operation state, the communication node 12A which is set in the normal operation state earliest after the beginning of activation, outputs digital activation information DSS onto the communication line 11, and the digital activation information DSS is fetched only from the communication line 11 by the remaining communication nodes 12B and 12C. For this reason, even when the communication nodes 12A, 12B, and 12C have different rise times upon their activation, the traffic amount associated with digital information on the communication line 11 during the period from the beginning of activation until the communication nodes 12A, 12B, and 12C are set in the normal operation state can be effectively, reduced.

Furthermore, in the example shown in FIG. 1, when one of the communication nodes 12A, 12B, and 12C in the normal operation state must be reset due to, e.g., a failure, and must be activated again, or when one of the communication nodes 12A, 12B, and 12C is activated after other nodes are set in the normal operation state, the communication node to be activated can be quickly shifted to the normal operation state.

For example, as shown in FIG. 2, when the communication node 12C, which is set in a normal operation state during the period TTC starting from the timing t5, is reset at a timing t9 after the timing t8 for some reason, and its activation is started at the timing t9, the arithmetic processing unit of the communication node 12C inhibits both the information output operation and the information fetching operation performed via the communication unit during a predetermined period TNC' from the activation start timing t9 to a later timing t10. Thereafter, when the timing t10 has reached and the period TNC' has elapsed, the arithmetic processing unit permits the information fetching operation performed via the communication unit and inhibits the information output operation performed via the communication unit during a period TRC' following the period TNC'. Therefore, during the period TRC' starting from the timing t10, the communication node 12C can fetch digital information from the communication line 11 via the bidirectional service line 13 but cannot output digital information onto the communication line 11 via the bidirectional service line 13.

In this manner, when the communication node 12C which begins to be activated at the timing t9 is recovered at the timing t10 from the state wherein neither the output operation of digital information onto the communication line 11 via the bidirectional service line 13 nor the fetching operation of digital information from the communication line 11 via the bidirectional service line 13 are performed to the state wherein only the fetching operation of digital information is performed, the arithmetic processing unit 16 of the communication node 12A in the normal operation state outputs the activation data frame shown in FIG. 3 onto the communication line 11 via the bidirectional service line 13.

Thereafter, based on information reception acknowledge data ANC of a data frame which is returned from the communication line 11 to the communication node 12A via the bidirectional service line 13, and is fetched by the communication node 12A via the communication unit 14, the recovery of the communication node 12C is detected. Furthermore, at a timing t11 shown in FIG. 2, the arithmetic processing unit 16 of the communication node 12A, which detects the recovery of the communication node 12C, outputs digital recovery acknowledge information DRR acknowledging detection of the recovery as communication digital information to the communication unit 14 via the data bus 15, and the digital recovery acknowledge information DRR is output from the communication unit 14 onto the communication line 11 via the bidirectional service line 13. In this case, the digital recovery acknowledge information DRR is one of some pieces of digital control information generated by the arithmetic processing unit 16, and forms, as a recovery acknowledge data frame, the same data frame as those of other kinds of digital control information. The data frame is converted into the format of, e.g., an NRZ modulation carrier signal in the communication unit 14. In this manner, at the timing t11, the communication node 12A outputs the digital recovery acknowledge information DRR having the format of the NRZ modulation carrier signal onto the communication line 11 via the bidirectional service line 13.

Also, at the timing t10, the arithmetic processing unit of the communication node 12B in the normal operation state outputs an activation data frame onto the communication line 11 via the communication unit and the bidirectional service line 13. Thereafter, based on information reception acknowledge data ANC in a data frame constituted by digital control information which is returned from the communication line 11 to the communication node 12B via the bidirectional service line 13 and is fetched by the communication node 12B via the communication unit, the recovery of the communication node 12C is detected. The arithmetic processing unit of the communication node 12B, which detects the recovery of the communication node 12C, also outputs digital recovery acknowledge information DRR acknowledging detection of the recovery as communication digital information to the communication unit of the communication node 12B at the timing t11 shown in FIG. 2, and the digital recovery acknowledge information DRR is output from the communication unit onto the communication line 11 via the bidirectional service line 13. In this manner, at the timing t11, the communication node 12B outputs the digital recovery acknowledge information DRR having the format of the NRZ modulation carrier signal onto the communication line 11 via the bidirectional service line 13, as well.

The digital recovery acknowledge information DRR, which is output from each of the communication nodes 12A and 12B onto the communication line 11 via the bidirectional service line 13 at the timing t11, is fetched from the communication line 11 by the communication unit of the communication node 12C, which is still in the period TRC', via the bidirectional service line 13, and is output to the arithmetic processing unit. In the communication node 12C which fetched the digital recovery acknowledge information DRR, the arithmetic unit permits the information output operation performed via the communication unit in addition to the information fetching operation performed via the communication unit, in accordance with the fetched digital recovery acknowledge information DRR. Therefore, in the communication node 12C, as shown in FIG. 2, the period TRC' starting from the timing t10 ends at the timing t11 before an elapse of a predetermined period of time, and during a period TTC' after the timing t11, a normal operation state wherein the information fetching operation and the information output operation are selectively performed is set. Thus, the fetching operation of digital information from the communication line 11 via the bidirectional service line 13, and the output operation of digital information onto the communication line 11 via the bidirectional service line 13 are selectively performed.

In the communication node 12C which is set in the normal operation state after the timing t11, the arithmetic processing unit outputs, as communication digital information, digital transmission request information DTT for requesting the communication nodes 12A and 12B to output designated digital control information, at a timing t12 immediately after the timing t11 shown in FIG. 2, and the digital transmission request information DTT is output from the communication unit onto the communication line 11 via the bidirectional service line 13. In this case, the digital transmission request information DTT forms a data frame as in other kinds of digital control information, and is converted into the format of, e.g., an NRZ modulation carrier signal in the communication unit. In this manner, at the timing t12, the communication node 12C outputs the digital transmission request information DTT in the form of the NRZ modulation carrier signal onto the communication line 11 via the bidirectional service line 13.

Figure 4:
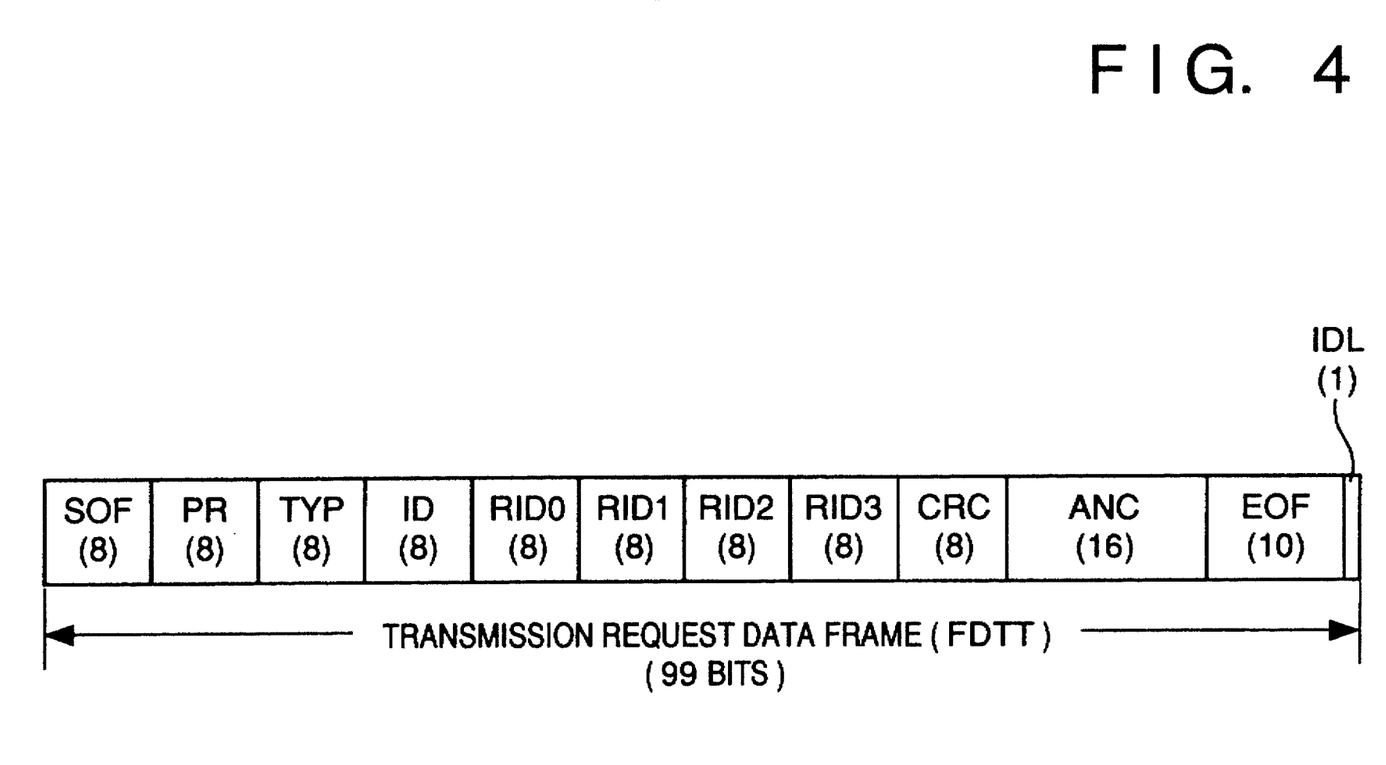
FIG. 4 is a schematic view for explaining the data format of a data frame of another digital control information processed in the multiplex transmission system according to the present invention.

A transmission request data frame FDTT formed by the digital transmission request information DTT is a group of code data, which has a predetermined data length (e.g., a total of 99 bits), as shown in FIG. 4, and in its contents, an 8-bit frame start marker SOF, 8-bit data PR associated with the priority order, 8-bit data TYP indicating the type of data frame, 8-bit information identification data ID indicating the type of digital information to be transmitted, 8-bit request information data RID0, RID1, RID2, and RID3 indicating the type of digital information which is to be requested to be transmitted, 8-bit error correction data CRC, 16-bit information reception acknowledge data ANC, a 10-bit frame end marker EOF, and 1-bit idling marker IDL sequentially appear. In this transmission request data frame FDTT, the information identification data ID indicates that the digital information to be transmitted is digital transmission request information DTT.

The digital transmission request information DTT, which is output from the communication node 12C onto the communication line 11 via the bidirectional service line 13 at the timing t12, is fetched from the communication line 11 by the communication unit 14 of the communication node 12A in the normal operation state via the bidirectional service line 13, and is output to the arithmetic processing unit 16. Similarly, the digital transmission request information DTT is fetched from the communication line 11 by the communication unit of the communication node 12B in the normal operation state via the bidirectional service line 13, and is output to the arithmetic processing unit.

In the communication node 12A which fetched the digital transmission request information DTT from the communication node 12C, the arithmetic processing unit 16 checks if a response to the fetched digital transmission request information DTT is necessary. If the response is necessary, the arithmetic processing unit 16 outputs digital control information corresponding to the request of the fetched digital transmission request information DTT to the communication unit as communication digital information, and the digital control information is output from the communication unit 14 onto the communication line 11 via the bidirectional service line 13 at a timing t13 after the timing t12 shown in FIG. 2. The digital control information output as a response also forms a data frame as in other kinds of digital control information, and is converted into the format of, e.g., an NRZ modulation carrier signal in the communication unit 14. In this manner, at the timing t13, the communication node 12A outputs the digital control information corresponding to the request of the digital transmission request information DTT onto the communication line 11 via the bidirectional service line 13 in the format of the NRZ modulation carrier signal.

Also, in the communication node 12B which fetched the digital transmission request information DTT from the communication node 12C, the arithmetic processing unit checks if a response to the fetched digital transmission request information DTT is necessary. If the response is necessary, the arithmetic processing unit outputs digital control information corresponding to the request of the fetched digital transmission request information DTT to the communication unit as communication digital information, and the digital control information is output from the communication unit onto the communication line 11 via the bidirectional service line 13 at a timing t14 after the timing t12 shown in FIG. 2. The digital control information output as a response also forms a data frame as in other kinds of digital control information, and is converted into the format of, e.g., an NRZ modulation carrier signal in the communication unit. In this manner, at the timing t14, the communication node 12B outputs the digital control information corresponding to the request of the digital transmission request information DTT onto the communication line 11 via the bidirectional service line 13 in the format of the NRZ modulation carrier signal.

As described above, the digital control information output in correspondence with the request of the digital transmission request information DTT at the timing t13, and the digital control information output from the communication node 12B in correspondence with the request of the digital transmission request information DTT at the timing t14 are fetched by the communication node 12C, which output the digital transmission request information DTT at the timing t12, via the communication unit under the control of the arithmetic processing unit, and are used in the initial operation state setting operation of the communication node 12C.

In the example of the above-mentioned multiplex communication system, the three communication nodes 12A, 12B, and 12C are connected to the communication line 11. However, the multiplex transmission system according to the present invention has no limitations as to the number of communication nodes connected to the communication line 11. For example, two or four or more communication nodes may be connected to the communication line.

The arithmetic processing unit in each of the plurality of communication nodes connected to the communication line, which constitute the above-mentioned example of the multiplex transmission system of the present invention, executes the control operation upon activation of each communication node connected to the communication line, the control operation of the communication node which is recovered from the state wherein neither the information output operation nor the information fetching operation are performed to the state wherein only the information fetching operation is performed, the control operation in correspondence with digital transmission request information, and the like.

Figure 5:
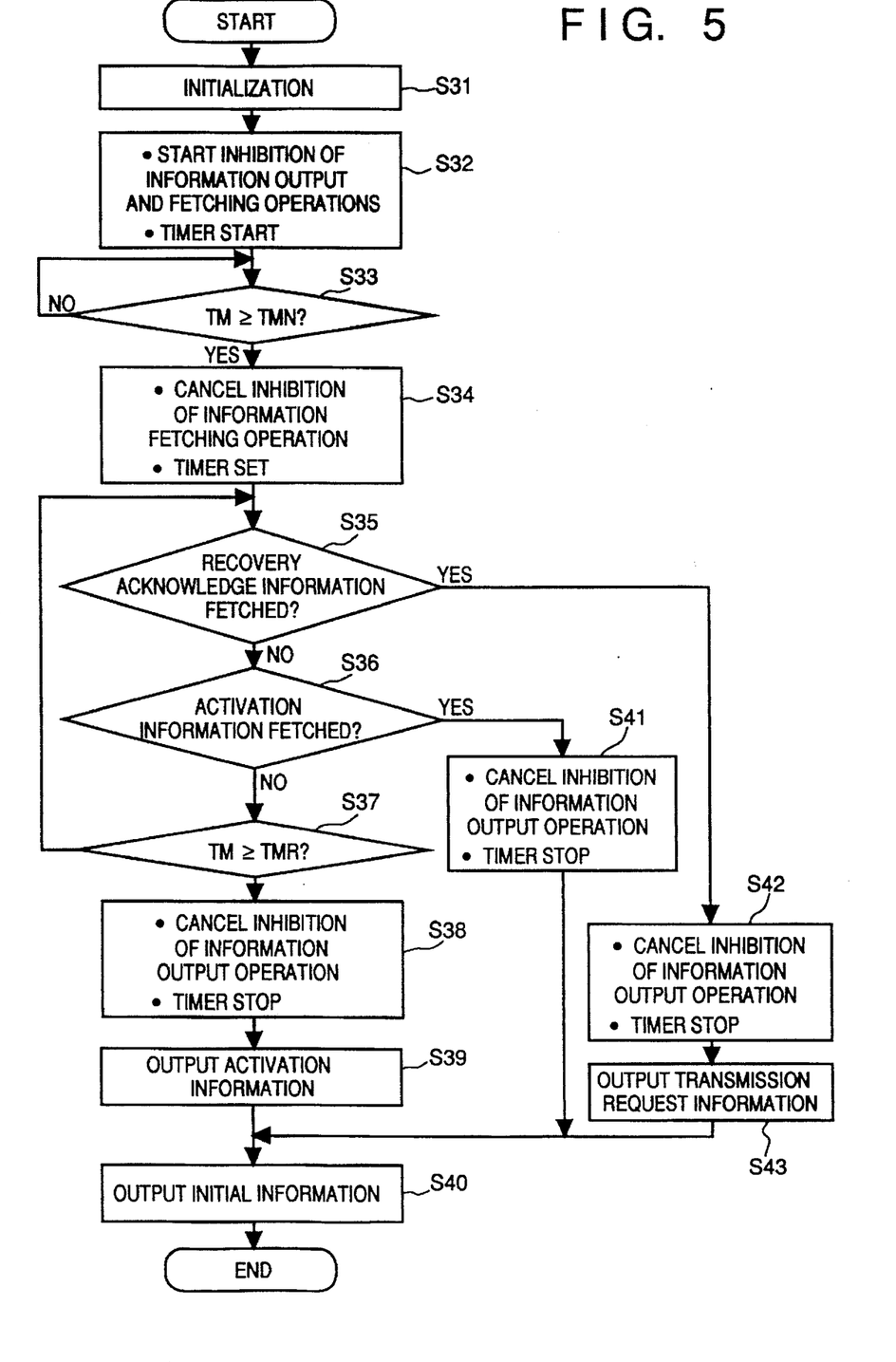
FIG. 5 is a flow chart showing a control program executed when an arithmetic processing unit equipped in each of a plurality of communication nodes constituting the multiplex transmission system of the present invention performs a control operation.
Figure 6:
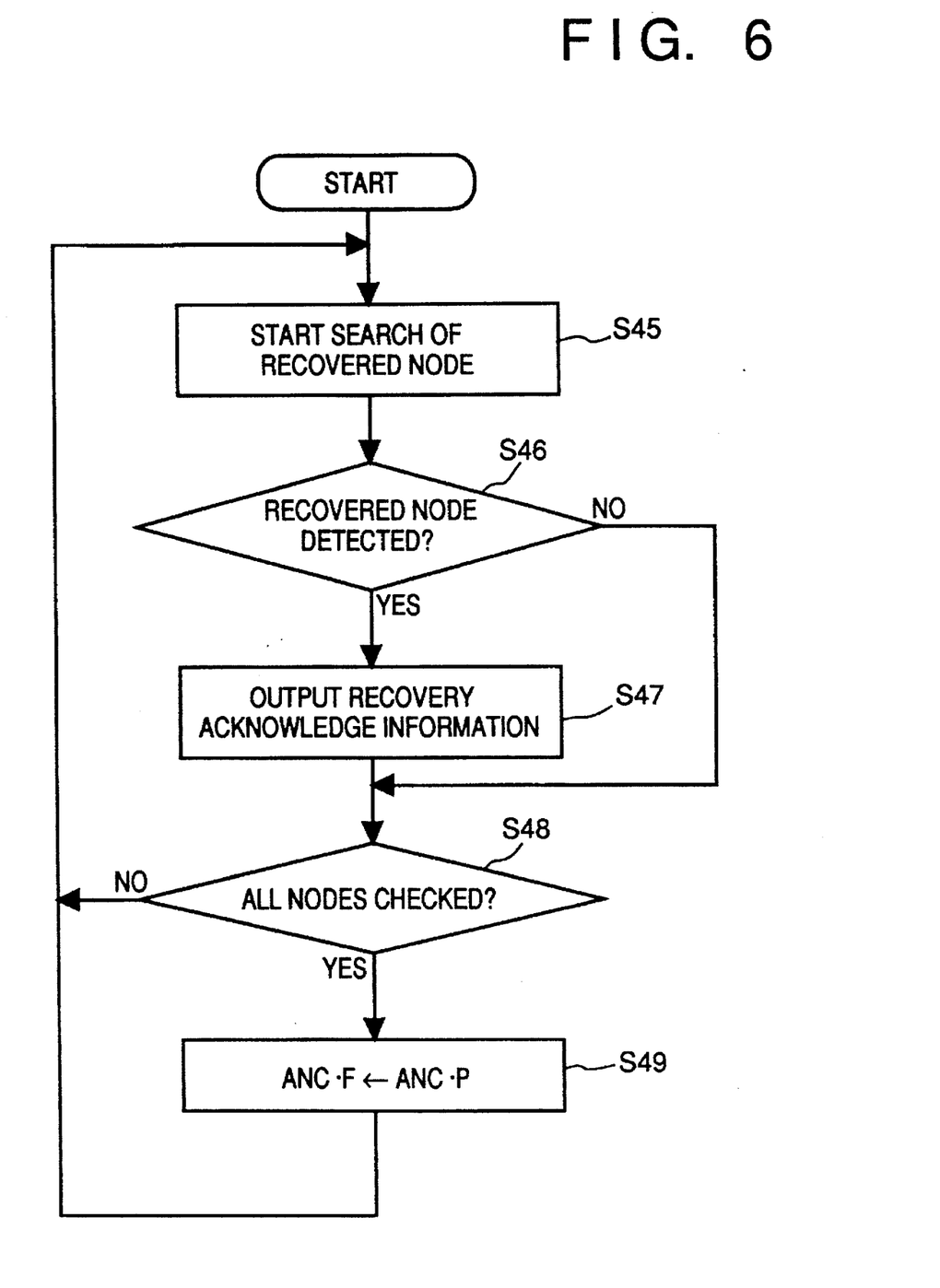
FIG. 6 is a flow chart showing a control program executed when the arithmetic processing unit equipped in each of the plurality of communication nodes constituting the multiplex transmission system of the present invention performs another control operation.
Figure 7:
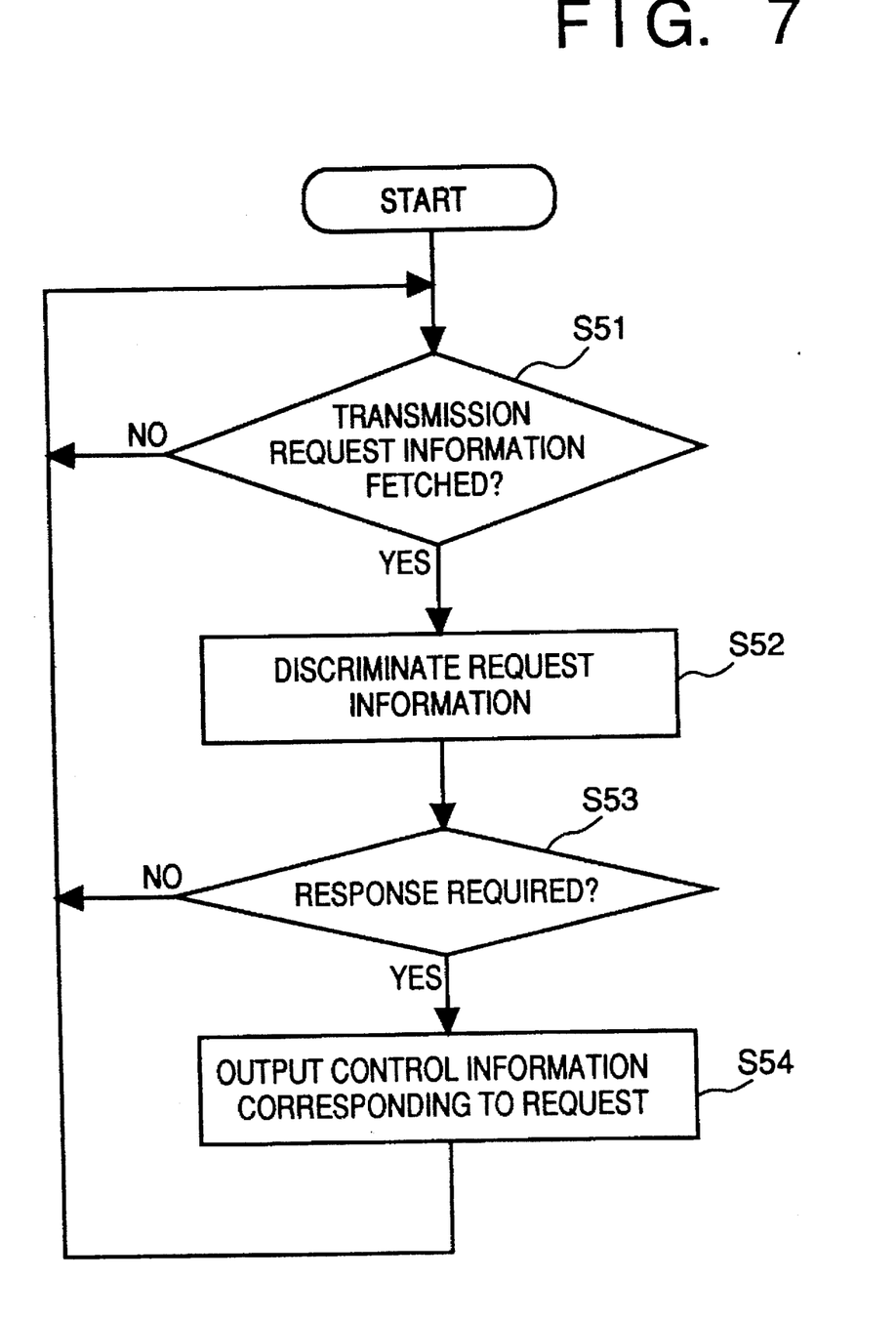
FIG. 7 is a flow chart showing a control program executed when the arithmetic processing unit equipped in each of the plurality of communication nodes constituting the multiplex transmission system of the present invention performs still another control operation.

An example of control programs used when the arithmetic processing unit arranged in each of the plurality of communication nodes constituting the multiplex transmission system according to the present invention executes the control operation upon activation of the communication node will be explained below. FIGS. 5 to 7 are flow charts showing the control programs executed when the arithmetic processing unit arranged in each of the plurality of communication nodes constituting the multiplex transmission system according to the present invention executes the control operation. More specifically, FIG. 5 is a flow chart showing an example of a control program for executing the control operation of the recovered communication node, and FIGS. 6 and 7 are flow charts showing the control programs for executing control operations upon transmission of recovery acknowledge information and digital transmission request information. In the following description, a communication node of interest is a communication node to which the arithmetic processing unit belongs.

Referring to FIG. 5, processing is started from the activation timing of the plurality of communication nodes connected to the communication line. After the flow starts, initialization is performed in step S31. In step S32, inhibition of the information output operation and the information fetching operation in the communication node of interest is started, and the measurement operation of an internal timer is started (timer start). It is then checked in step S33 if a measurement time TM of the timer has reached a time TMN which defines a predetermined first period (the period TNA for the communication node 12A, the period TNB for the communication node 12B, the period TNC for the communication node 12C, or an equivalent period). The time TMN is selected to be longer than the rise time of the communication node of interest. If it is determined in step S33 that the measurement time TM of the timer has not reached the time TMN, the checking operation in step S33 is repeated; otherwise, the flow advances to step S34.

In step S34, inhibition of the information output operation in the communication node of interest is continued, but information of the information fetching operation in the communication node of interest is canceled, and the measurement operation of the timer is reset (timer reset). It is checked in step S35 if digital recovery acknowledge information is fetched. If NO in step S35, it is checked in step S36 if digital activation information is fetched. If NO in step S36, it is checked in step S37 if the measurement time TM of the timer has reached a time TMR which defines a predetermined second period (the period TRA for the communication node 12A, the period TRB for the communication node 12B, the period TRC for the communication node 12C, or an equivalent period). If it is determined in step S37 that the measurement time TM of the timer has not reached the time TMR yet, the flow returns to step S35; otherwise, the flow advances to step S38.

In step S38, inhibition of the information output operation in the communication node of interest is canceled in addition to the information fetching operation in the communication node of interest so as to set the communication node of interest in a normal operation state, and the measurement operation of the timer is stopped (timer stop). In step S39, digital activation information indicating the end of activation in the communication node of interest is output from the communication node of interest onto the communication line. In step S40, the communication node of interest performs an initial information output operation for outputting a group of digital control information to be output as needed onto the communication line, and the program ends.

On the other hand, if it is determined in step S36 that the digital activation information is fetched, inhibition of the information output operation in the communication node of interest is canceled in addition to the information fetching operation in the communication node of interest so as to set the communication node of interest in a normal operation state, and the measurement operation of the timer is stopped (timer stop) in step S41. Thereafter, the flow advances to step S40. Furthermore, if it is determined in step S35 that the digital recovery acknowledge information is fetched, inhibition of the information output operation in the communication node of interest is canceled in addition to the information fetching operation in the communication node of interest so as to set the communication node of interest in a normal operation state, and the measurement operation of the timer is stopped (timer stop) in step S42. In step S43, the communication node of interest outputs digital transmission request information for requesting other communication nodes to output designated digital control information onto the communication line, and thereafter, the flow advances to step S40.

Referring to FIG. 6, after the processing starts, the search operation of a communication node (recovered communication node), which is recovered from the state wherein neither the information output operation nor the information fetching operation are performed to the state wherein only the information fetching operation is performed is started in step S45. It is checked in step S46 if a recovered communication node is detected. The recovered communication node is detected by comparing the present contents ANC•P of the information reception acknowledge data ANC in the data frame to be output from the communication node of interest with the contents ANC•F before being updated to the present contents ANC•P.

If it is determined in step S46 that a recovered communication node is detected, digital recovery acknowledge information acknowledging detection of the recovery is output from the communication node of interest onto the communication line in step S47, and the flow advances to step S48. On the other hand, if it is determined in step S46 that a recovered communication node is not detected, the flow advances directly from step S46 to step S48. It is checked in step S48 if the checking operation of the recovered communication node is made for all the communication nodes. If NO in step S48, the flow returns to step S45; otherwise, the contents ANC•F of the information reception acknowledge data ANC are updated to the present contents ANC•P in step S49, and the flow then returns to step S45.

In step S53 shown in FIG. 7, it is checked if the fetched digital transmission request information requests a response. If NO in step S53, the flow returns to step S51. However, if YES in step S53, the requested digital control information based on the discrimination result in step S52 is output from the communication node of interest onto the communication line in step S54, and thereafter, the flow returns to step S51.

(Effect of Embodiment)

As described above, as can be seen from the embodiment of the present invention, when a plurality of communication nodes connected to a communication line are activated by switching their power supply units from an OFF state to an ON state, digital activation information is output, onto the communication line, from a node, which is set in a normal communication state earliest after the beginning of activation, of the plurality of communication nodes during a period from the beginning of activation until each node is set in the normal operation state, and the digital activation information is fetched from the communication line by the remaining ones of the plurality of communication nodes. For this reason, even when the plurality of communication nodes have different rise times upon activation, the traffic amount associated with digital information on the communication line during the period after the beginning of activation until the nodes are set in the normal operation state can be effectively reduced, and efficient transmission of digital information via the communication line and quick transmission/reception at each communication node can be realized.

In addition to the above-mentioned advantage, each of the plurality of communication nodes can fetch designated digital information, which is required in its own processing operation state setting operation and is output from each of the remaining communication nodes, from the communication line without outputting digital transmission request information onto the communication line.

Also, of the plurality of communication nodes, a recovered node, which is recovered from the state wherein both the information output operation and the information fetching operation are inhibited to the state wherein the information fetching operation is permitted but the information output operation is inhibited, can quickly set a normal operation state on the basis of digital recovery acknowledge information from the remaining nodes. Furthermore, when the recovered node of the plurality of communication nodes is set in the normal operation state based on the recovery acknowledge information from the remaining communication nodes, and then outputs digital transmission request information onto the communication line, it can fetch digital information required for its own initial operation state setting operation from the communication line.

The present invention is not limited to the above embodiments and various changes and modifications can be made within the spirit and scope of the present invention. Therefore, to apprise the public of the scope of the present invention the following claims are made.

What is claimed is:

1. A multiplex transmission system to which a plurality of communication nodes are connected via a multiplex transmission path, and in which each of said plurality of communication nodes comprises a control unit for, when a communication state is normal, controlling transmission of a communication frame having its own predetermined data via said multiplex transmission path and selective reception of a communication frame transmitted from another communication node, each of said plurality of communication nodes comprising:
  detection means for detecting if the communication state of its own communication node is normal;
  means for, when the communication state of the communication node is not normal, setting the communication state of its own node as a first communication state, and prohibiting transmission and reception of the communication frame during a predetermined first period after detection of the communication state;
  means for setting the communication state of its own node as a second communication state, and prohibiting transmission of the communication frame but permitting reception of the communication frame during a predetermined second period after the end of the first period; and
  means for, when a predetermined communication frame transmitted from another communication node is received On the Second communication state, permitting transmission of the communication frame of its own node, while is still being in the second communication state, before the end of the second period.

2. The system according to claim 1, wherein when the second period has elapsed without receiving the predetermined communication frame, each of said plurality of communication nodes permits transmission of the communication frame of its own node, and transmits the predetermined communication frame from its own node.

3. The system according to claim 2, wherein a case in which the communication state of the communication node is not normal corresponds to a state wherein the communication node is being activated or is reset, and the control unit of the communication node which has measured the second period transmits a predetermined communication frame indicating the end of activation or reset of its own communication node.

4. The system according to claim 2, wherein the control unit of the communication node which has measured the second period transmits a group of initial communication frames, each of which describes initial data required for other communication nodes, from its own communication node.

5. The system according to claim 1, wherein the control unit of the communication node in which the communication state is normal further comprises means for detecting if another communication node shifts from the first period to the second period and transmits a recovery acknowledge communication frame indicating that the other communication node is recovered from a state in which both the transmission and reception are inhibited to a state in which the transmission is inhibited but the reception is permitted during the second period, and when the communication node, which is shifted to the second period, receives the recovery acknowledge communication frame transmitted from another communication node, the communication node sets a state wherein the transmission of the communication frame of its own node is permitted before the end of the measurement of the second period.

6. The system according to claim 5, wherein after the control unit of each of said plurality of communication nodes sets the state wherein the transmission of the communication frame of its own node is permitted upon reception of the recovery acknowledge communication frame, the control unit transmits a transmission request frame for requesting other communication nodes to transmit designated control data, and when the transmission request frame transmitted from another communication node is received, the control unit describes its own predetermined data designated in the transmission request frame in a communication frame and transmits the communication frame via said multiplex transmission path.

7. The system according to claim 1, wherein the first and second periods are independently measured and set by the control unit of each of said plurality of communication nodes.

8. The system according to claim 1, wherein the communication frame is transmitted in a format of an NRZ modulation carrier signal.

9. The system according to claim 1, wherein its own predetermined data is data representing an operation state of a vehicle.

10. A multiplex transmission system to which a plurality of communication nodes are connected via a multiplex transmission path, and in which each of said plurality of communication nodes comprises a control unit for, when a communication state is normal, controlling transmission of a communication frame having its own predetermined data via said multiplex transmission path and selective reception of a communication frame transmitted from another communication node, each of said plurality of communication nodes comprising:
detection means for detecting if the communication state of its own communication node is normal;
means for, when the communication state of the communication node is not normal, setting the communication state of its own node as a first communication state, and prohibiting transmission and reception of the communication frame during a predetermined first period after detection of the first communication state; and
means for setting the communication state of its own node as a second communication state, and prohibiting transmission of the communication frame but permitting reception of the communication frame during a predetermined second period after the end of the first period,
wherein the communication node, in which the second period ends earliest and transmission of the communication frame is permitted, of said plurality of communication nodes transmits a predetermined communication frame from its own node via said multiplex transmission path.

11. The system according to claim 10, wherein each of said plurality of communication nodes further comprises means for, when the communication node in the second period receives the predetermined communication frame, permitting transmission of the communication frame of its own node before an elapse of the second period, and for, when the second period has elapsed without receiving the predetermined communication frame from another communication node, permitting transmission of the communication frame of its own node, and means for, when the second period ends, transmitting the predetermined communication frame from its own node.

12. The system according to claim 10, wherein a case in which the communication state of the communication node is not normal corresponds to a state wherein the communication node is being activated or is reset, and the control unit of the communication node in which the second period ends earliest transmits the predetermined communication frame indicating the end of activation or reset of its own communication node.

13. The system according to claim 12, wherein the control unit of the communication node in which the second period ends earliest transmits a group of initial communication frames, each of which describes initial data required for other communication nodes, from its own communication node.

14. The system according to claim 10, wherein the control unit of the communication node in which the communication state is normal further comprises means for detecting if another communication node shifts from the first period to the second period and transmits a recovery acknowledge communication frame indicating that the other communication node is recovered from a state in which both the transmission and reception are inhibited to a state in which the transmission is inhibited but the reception is permitted during the second period, and when the communication node, which is shifted to the second period, receives the recovery acknowledge communication frame transmitted from another communication node, the communication node sets a state wherein the transmission of the communication frame of its own node is permitted before the end of the measurement of the second period.

15. The system according to claim 14, wherein after the control unit of each of said plurality of communication nodes sets the state wherein the transmission of the communication frame of its own node is permitted upon reception of the recovery acknowledge communication frame, the control unit transmits a transmission request frame for requesting other communication nodes to transmit designated control data, and when the transmission request frame transmitted from another communication node is received, the control unit describes its own predetermined data designated in the transmission request frame in a communication frame and transmits the communication frame via said multiplex transmission path.

16. The system according to claim 10, wherein the first and second periods are independently measured and set by the control unit of each of said plurality of communication nodes.

17. The system according to claim 10, wherein the communication frame is transmitted in a format of an NRZ modulation carrier signal.

18. The system according to claim 10, wherein its own predetermined data is data representing an operation state of a vehicle.

19. A multiplex transmission apparatus which transmits a communication frame having its own predetermined data via a multiplex transmission path, and selectively receives a communication frame transmitted from a transmitting side of another multiplex transmission apparatus, comprising:

detection means for detecting a predetermined condition;

means for, when the predetermined condition is detected, setting a communication state of its own as a first communication state, and prohibiting transmission and reception of the communication frame during a predetermined first period;

means for setting the communication state of its own as a second communication state, and prohibiting transmission of the communication frame but permitting reception of the communication frame during a predetermined second period after the end of the first period;

means for, when a predetermined communication frame is received on the second communication state, permitting transmission of the communication frame before an elapse of the second period, and for when the second period has elapsed without receiving the predetermined communication frame, permitting transmission of its own communication frame; and means for, when the second period has elapsed, transmitting the predetermined communication frame.

20. The apparatus according to claim 19, wherein the predetermined condition is a state in which said multiplex transmission apparatus is being activated or is reset, and the predetermined communication frame indicating the end of the activation or reset state is transmitted when the measurement of the second period ends.

21. The apparatus of according to claims 20, wherein when the second period ends, a group of initial communication frames, each of which describes initial data required at a receiving side, are transmitted from its own side.

22. The apparatus according to claim 19, further comprising means for, when a communication state is normal, detecting if another multiplex transmission apparatus shifts from the first period to the second period, and wherein when said means detects that the other multiplex transmission apparatus shifts from the first period to the second period, said multiplex transmission apparatus transmits a recovery acknowledge communication frame indicating that the other multiplex transmission apparatus is recovered from a state in which the transmission and reception of the communication frame are inhibited to a state wherein the reception is permitted, and the other multiplex transmission apparatus which shifts to the second period sets a state in which transmission of its own communication frame is permitted before the end of measurement of the second frame upon reception of the recovery acknowledge communication frame transmitted from said multiplex transmission apparatus.

23. The apparatus according to claim 22, wherein after the recovery acknowledge frame is received and the state in which the transmission of its own communication frame is permitted is set, a transmission request frame requesting transmission of designated control data is transmitted, and when the transmission request frame transmitted from the transmitting side is received, its own predetermined data designated in the transmission request frame is described in a communication frame, and the communication frame is transmitted via said multiplex transmission path.

24. The apparatus according to claim 19, wherein the communication frame is transmitted in a format of an NRZ modulation carrier signal.

25. The apparatus according to claim 19, wherein its own predetermined data is data representing an operation state of a vehicle.

* * * * *

UNITED STATES PATENT AND TRADEMARK OFFICE
CERTIFICATE OF CORRECTION

PATENT NO. : 5,629,941
DATED : May 13, 1997
INVENTOR(S) : Kawanishi et al.

It is certified that error appears in the above-identified patent and that said Letters Patent is hereby corrected as shown below:

Title page, [56], under "References Cited", insert:

```
--5,490,143  2/1996  Hara et al.      ..........370/85.2
  5,343,472  8/1994  Michihira et al. ....370/85.6
  4,914,654  4/1990  Matsuda et al.   .....370/85.1--.
```

Col. 12, line 27, delete ",".

Col. 18, line 67, change "On" to --on--; and, change "Second" to --second--.

Signed and Sealed this

Thirtieth Day of June, 1998

Attest:

BRUCE LEHMAN

*Attesting Officer*  *Commissioner of Patents and Trademarks*